Nov. 20, 1951  G. E. DATH  2,575,491
RUBBER SHOCK ABSORBING MEANS FOR RAILWAY DRAFT RIGGINGS
Filed Dec. 27, 1948  2 SHEETS—SHEET 1
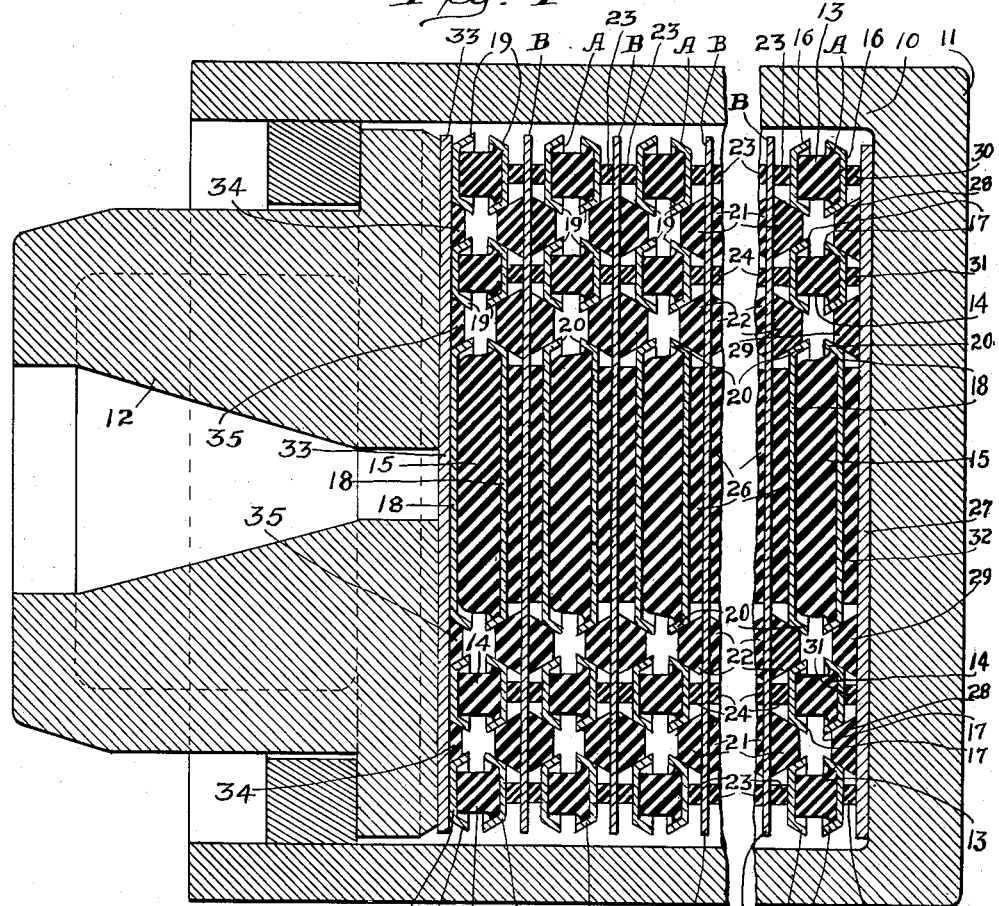
Inventor:
George E. Dath.
By Henry Fuchs.
Atty.

Nov. 20, 1951 G. E. DATH 2,575,491
RUBBER SHOCK ABSORBING MEANS FOR RAILWAY DRAFT RIGGINGS
Filed Dec. 27, 1948 2 SHEETS—SHEET 2
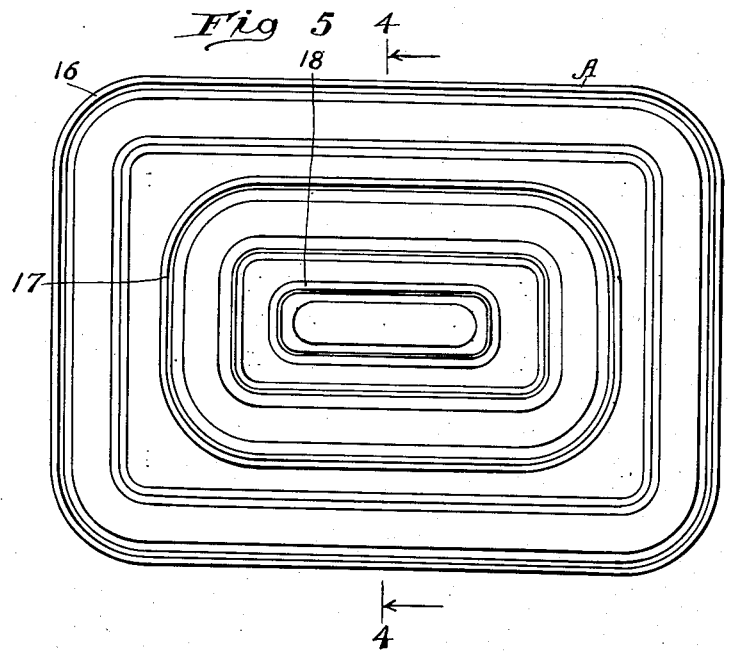
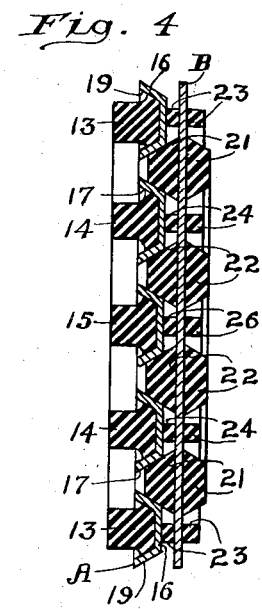
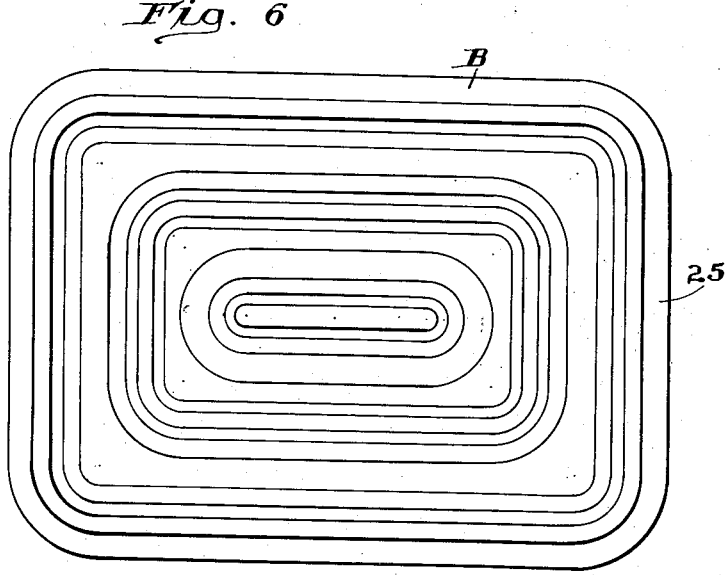
Inventor:
George E. Dath.
By Henry Fuchs
Atty.

Patented Nov. 20, 1951

2,575,491

UNITED STATES PATENT OFFICE 2,575,491

RUBBER SHOCK ABSORBING MEANS FOR RAILWAY DRAFT RIGGINGS

George E. Dath, Mokena, Ill., assignor to W. H. Miner, Inc., Chicago, Ill., a corporation of Delaware Application December 27, 1948, Serial No. 67,447

4 Claims. (Cl. 213—45)

This invention relates to improvements in rubber shock absorbing elements especially adapted for use in connection with railway draft riggings.

One object of the invention is to provide a rubber shock absorbing element composed of a plurality of units, each comprising a plurality of radially spaced, concentric rubber rings interposed between metal rings, and a plurality of units alternated with the first named units, comprising metal backing plates having concentric rubber rings projecting from opposite sides thereof and having wedging engagement with the metal rings.

A further object of the invention is to provide a rubber shock absorbing element, as set forth in the preceding paragraph, wherein the backing plates are provided with additional concentric rubber rings projecting from opposite sides thereof and bearing on the metal rings of the adjacent units to be compressed thereagainst.

Other objects of the invention will more clearly appear from the description and claims hereinafter following.

In the accompanying drawings forming a part of this specification, Figure 1 is a broken, horizontal, longitudinal sectional view of the casing and pressure transmitting plunger of a shock absorbing mechanism, illustrating my improved rubber shock absorbing element in connection therewith. Figure 2 is an elevational view of one of the metal rings of the sets employed in my improved shock absorbing element, the ring shown being that at the right hand end of Figure 1, looking from left to right in said figure. Figure 3 is an elevational view of one of the backing plates and the associated rubber rings of the same, the backing plate being that at the left hand end of Figure 1, looking from left to right in said figure. Figure 4 is a longitudinal vertical sectional view through two adjacent units of the shock absorbing element shown in Figure 1, said section corresponding substantially to the line 4—4 of Figure 5. Figure 5 is a side elevational view of Figure 4, looking from left to right in said figure. Figure 6 is a side elevational view of Figure 4, looking from right to left in said figure.

In said drawings, my improved rubber shock absorbing element is shown as employed in connection with a shock absorber of well-known design, including a casing 10 open at its front end and closed at its rear end by a transverse wall 11, and a pressure transmitting plunger 12 slidingly telescoped within the casing, my improved shock absorbing element being interposed between the plunger 12 and said rear end wall of the casing.

My improved shock absorbing element comprises broadly a plurality of units A—A arranged in series, and a plurality of units B—B also arranged in series and alternated with the units A—A.

Each unit A includes outer and inner, rectangular rubber rings 13 and 14 and an elongated central rubber block 15, front and rear metal rings 16—16 between which the ring 13 is interposed, front and rear metal rings 17—17 between which the ring 14 is interposed, and front and rear pan-shaped members 18—18 between which the block 15 is interposed.

The metal rings 16 and 17 of each unit A are provided with laterally extending, peripheral, inner and outer flanges 19—19 at the inner sides thereof, which flare outwardly. The pan-shaped members 18—18 of each unit A are also provided with laterally extending, peripheral flanges 20—20 at the inner sides thereof, which flare outwardly. The rubber ring 13 of each unit A, which ring is embraced between the metal rings 16—16, is preferably vulcanized to the right hand ring 16, as seen in Figure 1, and the rubber ring 14 and the rubber block 15 are secured in a similar manner to the right hand ring 17 and the right hand pan-shaped member 18.

Each unit B includes a flat metal backing plate 25, outer and inner, relatively heavy rubber rings 21—21 and 22—22 of substantially rectangular shape, outer and inner, relatively lighter, rectangular rubber rings 23—23 and 24—24, and elongated rubber blocks 26—26, all of which are vulcanized to said plate. The rubber rings 23—23, which are the outermost of the group, are located at opposite sides of the plate 25 and bear on the outer sides of the rings 16—16 of adjacent units A—A. The rubber rings 21—21 of each unit B project from opposite sides of the plate 25 and are spaced from the rings 16—16, being surrounded by the latter. The rings 21—21 project from the plate 25 to a greater extent than the rings 23—23. Each ring 21 is tapered outwardly and has wedging engagement between the metal rings 16 and 17 at the opposed side of the adjacent unit A. The rings 22—22 of each unit B, which are the innermost rings, project from opposite sides of the plate 25 and each of said rings is tapered outwardly and has wedging engagement between the metal ring 17 and the pan-shaped member 18 at the opposed side of the adjacent unit A. The rings 24—24 of each unit B project from opposite sides of the member 18. Each ring 24 is located between the rings 21 and 22 and bears on the metal ring 17 at the opposed side of the adjacent unit A. The rubber blocks of each unit B project from opposite sides of the plate 25, substantially at the mid portion thereof, being aligned with and bearing on the pan-shaped members 18—18 of the adjacent units A—A, which are located at opposite sides of the unit B.

As shown in Figure 1, a heavy metal plate 27 provided with rubber rings 28, 29, 30, and 31, and a rubber block 32 on the inner side thereof, forms the rear end member of the rubber shock absorbing element. This plate bears flatly on the end wall 11 of the casing 10. The arrangement and structure of the rings 28, 29, 30, and 31 and of the block 32 of the plate 27 are identical with the arrangement and structure of the rings 21, 22, 23, and 24 and the block 26 at one side of the plate 25 of each unit B.

At the front end of the improved rubber shock absorbing element is preferably provided a heavy plate 33 bearing at its forward side on the plunger 12. This plate is provided with outer and inner, rectangular rubber rings 34 and 35 of outwardly tapered formation, projecting from the rear side thereof. The ring 34 has wedging engagement between the metal rings 16 and 17 and the ring 35 has wedging engagement between the metal ring 17 and pan-shaped member 18 at the front side of the adjacent unit A of the shock absorbing element.

In the operation of my improved shock absorbing element, upon compression of the same between the plunger 12 and the end wall 11 of the casing 10 of the shock absorbing mechanism, the rubber rings 13 and 14 and the rubber block 15 of each unit A are flattened out between the metal rings 16—16 and 17—17, and the pan-shaped members 18—18 and the rubber rings 23—23 and 24—24 and the rubber blocks 26—26 of each unit B are flattened out between the plate 27 of said unit and the metal rings 16—16 and 17—17 and the pan-shaped members 18—18 of the units A at opposite sides of said unit B, and the rubber rings 21—22 are flattened out and contracted by being wedged between the metal rings 16—16 and 17—17 and the pan-shaped members 18—18 of the adjacent units A—A.

When the actuating force is reduced, the expansive action of the rubber rings and blocks restores all of the parts of the shock absorbing element to the normal full release position shown in Figure 1, the expansive action of the rings 23—23 and 24—24 and of the blocks 26—26 of the plates 27 of the units B—B acting to positively withdraw the wedge-shaped rings 21—21 and 22—22 from active wedging engagement with the metal rings 16—16 and 17—17 and the pan-shaped members 18—18.

I claim:

1. In a rubber shock absorbing element for railway draft riggings, the combination with a series of units; of a second series of units alternated with said first named units, each of said first named units including a plurality of concentric rubber rings, and a pair of sheet metal rings bearing on the front and rear sides of each rubber ring, each of said second named units including a metal backing plate having wedge-shaped rubber rings having wedging engagement between adjacent metal rings of the first named units, which metal rings are at opposite sides of each of said second named units.

2. In a rubber shock absorbing element for railway draft riggings, the combination with a series of rubber units, each including concentric rubber rings embraced at opposite sides by sheet metal spacing rings having laterally projecting, inwardly diverging flanges overhanging said rubber rings; of a second series of units alternated with said first named units, each of said second named units including a metal backing plate having rubber rings projecting from opposite sides thereof, said last named rubber rings being tapered outwardly and having wedging engagement with the flanges of the spacing rings of the units of said first named series which are at opposite sides of said second named units.

3. In a rubber shock absorbing element for railway draft riggings, the combination with a series of units; of a second series of units alternated with said first named units, each of said first named units including a plurality of concentric rubber rings, and a pair of sheet metal rings bearing on the front and rear sides of each rubber ring, each of said second named units including a metal backing plate having wedge-shaped rubber rings having wedging engagement between adjacent metal rings of the first named units, which metal rings are at opposite sides of each of said second named units, said plates of said second named units having additional rubber rings projecting from opposite sides thereof bearing flatly on said metal rings of said first named units.

4. In a rubber shock absorbing element for railway draft riggings, the combination with a series of rubber units, each including concentric rubber rings embraced at opposite sides by sheet metal spacing rings having laterally projecting, inwardly diverging flanges overhanging said rubber rings; of a second series of units alternated with said first named units, each of said second named units including a metal backing plate having rubber rings projecting from opposite sides thereof, said last named rubber rings being tapered outwardly and having wedging engagement with the flanges of the spacing rings of the units of said first named series which are at opposite sides of said second named units, said plates of said second named units having additional rubber rings projecting from opposite sides thereof bearing flatly on said metal rings of said first named units.

GEORGE E. DATH.

REFERENCES CITED

The following references are of record in the file of this patent:

UNITED STATES PATENTS

| Number | Name | Date |
|---|---|---|
| 1,865,803 | Tucker | July 5, 1932 |
| 2,187,156 | Johnson | Jan. 16, 1940 |

FOREIGN PATENTS

| Number | Country | Date |
|---|---|---|
| 10,615 of 1889 | Great Britain | Apr. 1, 1890 |
| 4,317 of 1897 | Great Britain | Dec. 4, 1897 |